2,677,206

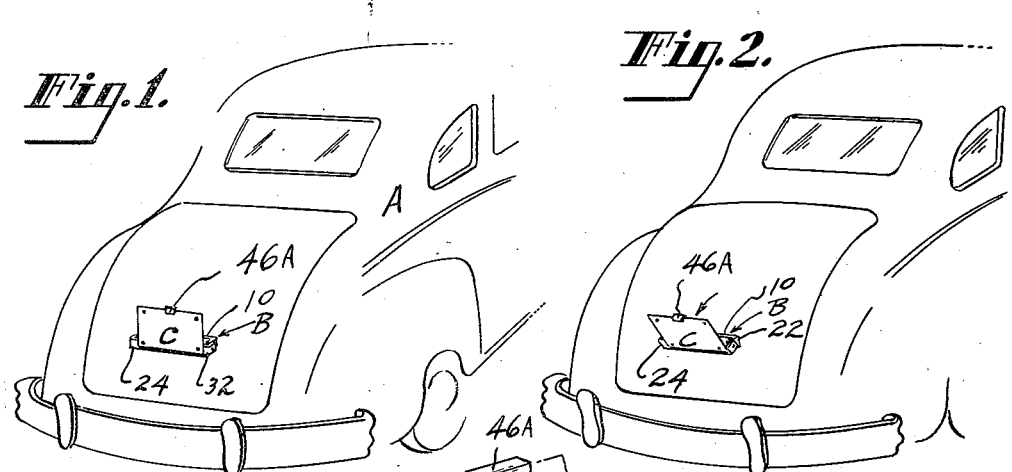
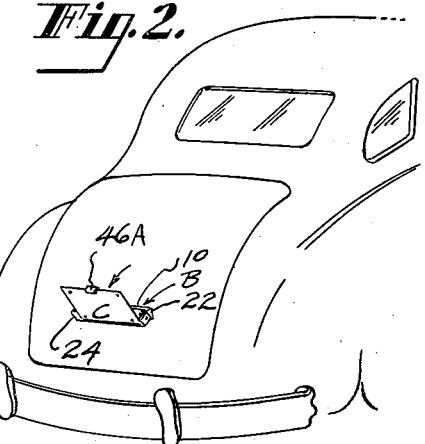
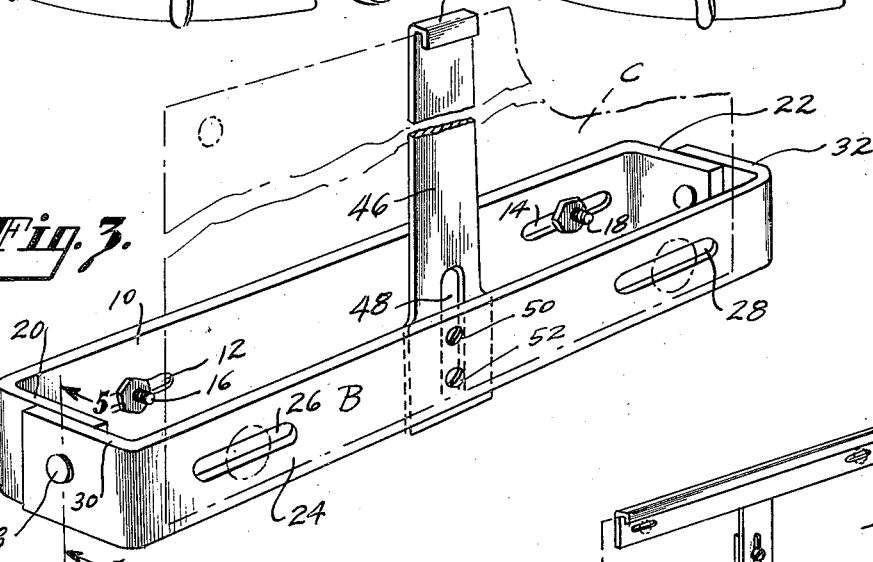
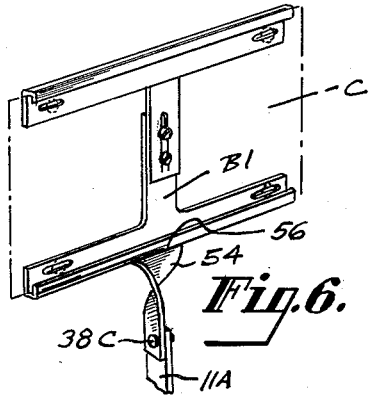
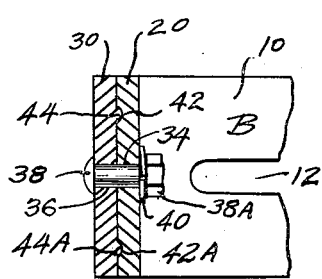
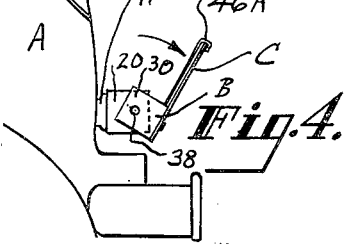
INVENTORS:
WILLIAM J. PAOLINI
THOMAS W. PAOLINI
AND ANTHONY D. PAOLINI
BY Harry Langsam
ATTORNEY Patented May 4, 1954

UNITED STATES PATENT OFFICE 2,677,206

AUTO TAG HOLDER HINGE

William J. Paolini, Thomas W. Paolini, and
Anthony D. Paolini, Philadelphia, Pa.

Application August 31, 1950, Serial No. 182,598

1 Claim. (Cl. 40—125)

Our invention relates to an auto tag holder and relates specifically to an auto tag holder made in the form of a hinge which is attached to the conventional stationary bracket, or holes, provided on a vehicle body.

Heretofore, auto tag holders have been manufactured and used but these were mostly for ornamental purposes, or for holding the auto tag in a predetermined position with respect to a portion of the body of the vehicle. The prior art devices permitted dirt and grime to accumulate behind the auto tag detracting from the appearance of the vehicle. When it was attempted to remove this dirt and grime by washing or polishing, the fingers were usually bumped, scratched or lacerated due to the inability to insert them in the narrow space between the body of the vehicle and the auto tag. In modern vehicles this danger of hurting the fingers and hand is even greater as the auto tag is generally recessed into the body of the vehicle or attached very closely to the body or bumpers of the vehicle.

It, therefore, is an object of our invention to provide a new and novel auto tag holder hinge which permits the auto tag to be swung away from the body or bumpers of a vehicle for purposes of cleaning away the dirt and grime which has accumulated therebeneath, and which is adapted to lock the auto tag in an upright position for displaying the auto tag.

Another object of our invention is to provide a new and novel auto tag holder hinge which is easily and quickly attached to the body of a vehicle.

Another object of our invention is to provide a new and novel auto tag holder hinge which supports the back and upper part of the auto tag to prevent damage thereto, and which is capable of accommodating different width auto tags.

Other objects of our invention are to provide a new and improved auto tag holder hinge which is easily and economically produced, which is sturdy in construction, and which is highly effective in use.

With the above and related objects in view, our invention consists in the details of construction and combination of parts, as will be more fully understood when the following description is read in conjunction with the accompanying drawing, in which:

Fig. 1 is a perspective view of an auto tag holder hinge embodying our invention bearing an auto tag and attached to the body of a vehicle.

Fig. 2 is a perspective view of the auto tag holder hinge of Fig. 1 showing the auto tag swung away from the body of the vehicle.

Fig. 3 is a detailed perspective view of an auto tag holder hinge embodying our invention.

Fig. 4 is a side view of an auto tag holder hinge embodying our invention bearing an auto tag and attached to the body of a vehicle.

Fig. 5 is a cross-sectional view taken along the line 5—5 of Fig. 3.

Fig. 6 is a modification of our auto tag holder hinge adapted to be used where only a single member is attached to the body of a vehicle.

Referring now in greater detail to the drawing wherein similar reference characters refer to similar parts, we show an automobile body, generally designated as A, to which is attached an auto tag holder hinge, generally designated as B, upon which is mounted an auto tag, generally designated as C.

The body of the vehicle A may be of any conventional design such as a coupe, sedan, convertible, truck or bus, having a stationary bracket 11, or holes in the body or bumpers, for holding an auto tag C in close relationship thereto.

The auto tag holder hinge B comprises a member 10 pivotally joined to a second member 24 and a bracket 46 attached to the member 24 to support the back and top of an auto tag.

The member 10 is of rectangular configuration and is made of sheet or strap metal having a pair of longitudinal slots 12 and 14 punched therethrough. The auto tag holder hinge B is secured to the stationary bracket 11, or holes in the body or bumpers of the vehicle A by passing the bolts 16 and 18 through the slots 12 and 14, respectively, and through the holes in the body, bumper or bracket 11 and then tightening the bolts 16 and 18. The member 10 is bent at its ends to form the short legs 20 and 22, respectively, perpendicular to the width of the member 10. The member 10 is pivotally joined to the member 24 as will be hereinafter described.

The second member 24 is of rectangular configuration and is made of sheet or strap metal having a pair of longitudinal slots 26 and 28 punched therethrough. An auto tag C is attached to the member 24 by means of bolts through the holes provided in the auto tag for this purpose and the slots 26, 28, respectively. The member 24 is also bent at each end to form the short legs 30 and 32, respectively, perpendicular to the width of the member 24. The legs 30 and 32 are spaced a sufficient distance apart to straddle, yet fit closely against the legs 20 and 22, respectively, of the member 10.

The pairs of legs 20, 30 and 22, 32 are pivotally joined to form a hinge whereby the body of the vehicle may be swung away from the body of the vehicle to permit washing or polishing behind the tag.

As the construction is alike on both ends of the auto tag holder hinge B, we shall confine our description to the pivotal joining of the pair of legs 20, 30, it being kept in mind that the pivotal joining of the pair of legs 22, 32 is of the same construction. Referring now to Fig. 5 it is seen that a bore 34 is provided through the leg 20 and a bore 36 is provided through the leg 30. The bores 34 and 36 are aligned and complementary to each other. A rivet, or bolt, 38 is passed through the bores 34 and 36 and a spring washer 40 is placed on the free end of rivet or bolt 38, then the end is provided with a nut 38A, to prevent the rivet, or bolt, 38 from being dislodged from the bores 34, 36. The spring washer 40 interposed between the leg 20 and the peened end, or nut, exerts a pressure tending to hold the legs 20, 30 together.

As the member 24 would move, or swing, due to the vibrations induced by the running of the vehicle A, or the weight of the tag C, a pair of depressions 42 and 42A are provided in the leg 20 and a pair of beads 44 and 44A are provided on the leg 30 to lock the auto tag in an upright position for display purposes. The depressions 42 and 42A are located in the outer portion of the leg 20 and the beads 44 and 44A are located on the inner portion of the leg 30. The beads 44 and 44A are complementary and interfit with the depressions 42 and 42A, respectively, and are so located that an auto tag carried by the member 24 is held in an upright position. However, the auto tag may be swung away from the body of the vehicle A by exerting a pressure on the auto tag in a direction away from the body A. This pressure should be sufficient to overcome the tension of the spring washer 40 and pull the beads 44 and 44A out of the depressions 42 and 42A, respectively, causing the legs 20 and 30 to spread apart and the spring washer 40 to flatten out. The tension of the spring washer 40 will tend to push the legs 20 and 30 together even when the tag is swung away from the body so that when it is raised again to an upright position, the instant the beads 44 and 44A coincide with the depressions 42 and 42A the beads will enter the depressions to lock the auto tag in an upright position.

The auto tag holder hinge B is further provided with an upright support 46 to prevent the auto tag C from being bent or deformed. The support 46 is made of metal and is bent at one end to resemble a J. A longitudinal slot 48 is provided in the leg of the support 46 adapting the support to be used on different width auto tags. The support 46 is attached to the member 24 at substantially its center by means of the bolts 50 and 52 passing through the member 24 and the slot 48 in the support 46. The hooked end 46A of the support 46 is placed over the top of the auto tag C and held firmly thereon then the bolts 50 and 52 are tightened to hold it securely in place. The leg of the support 46 against the back of the auto tag C prevents the tag C from being bent toward the body of the vehicle A while the hooked end 46A prevents the tag C from being bent away from the body of the vehicle A.

Referring now to Fig. 6 which illustrates a modification of our auto tag holder hinge B1 wherein the stationary bracket 11A attached to the body of the vehicle A consists of a single piece of metal. The auto tag hinge B1 comprises a single piece of sheet or strap metal 54 which is relatively wider than the stationary bracket 11A. The piece of sheet or strap metal 54 is twisted so one end lies in a plane transverse to the stationary bracket 11A while the other end lies in the same plane as the bracket 11A. The end of piece 54 which lies in a plane transverse to the bracket 11A is welded, or bolted, to a conventional tag holder at 56. The other end of the piece 54 is pivotally joined to the bracket 11A by means of a rivet, or bolt, 38C passing through complementary bores in the piece 54 and bracket 11A. The rivet, or bolt, 38C has a spring washer (not shown) placed on its free end which is peened, or provided with a nut (not shown) to prevent the rivet, or bolt, 38C from being dislodged from the piece 54 and the bracket 11A. The spring washer exerts a pressure tending to hold the piece 54 and the bracket 11A together. The piece 54 is locked in an upright position by means of small beads (not shown) near each edge of piece 54 which fit against and bear on corresponding edges of the bracket 11A. The locking action is similar to that of the auto tag holder hinge B except that the beads do not fit into recesses but tend to align the edges of the piece 54 with the corresponding edges of the bracket 11A.

From the foregoing description, it is apparent that an auto tag attached to an automobile body, bumper, or fender by means of our auto tag holder hinge is capable of being swung away from the upright position to permit cleaning or polishing of the surface behind the auto tag without the danger of skinning or lacerating the hand or fingers, while the locking arrangement insures that the auto tag will not swing from the upright position accidentally. Of course, it is apparent that the attaching of our device is just as simple as attaching an auto tag itself and that its attachment can be quickly and easily effected.

While our invention has been described in considerable detail, such description is merely intended as being illustrative rather than limiting, as our invention may be variously embodied, and the scope of the invention is to be determined as claimed.

We claim as our invention:

In an automobile tag holder hinge, a U-shaped member provided with a pair of longitudinal slots in its base for attaching an auto tag thereto, said member provided with a bore through each leg and a plurality of beads on the inner surface of each leg, another U-shaped member provided with a pair of longitudinal slots in its base for securing it to the body of a vehicle, said other member provided with a bore through each leg and a plurality of depressions in the outer surface of each leg, the legs of said first mentioned member being spaced to straddle the legs of said other member so that the bores in the legs of said first mentioned member coincide with the bores in the legs of said other member and said beads are complementary and interfit with said depressions, a bolt passed through each pair of coincidental bores, a spring washer on each of said bolts, and a nut on each of said bolts to secure the pairs of legs together, said beads and said depressions cooperating to lock said members in a predetermined position from which they may be disengaged by exerting a small outward and downward pressure against said first member, and an inverted J-shaped bracket attached to substantially the center of said first mentioned member, said bracket adapted to support the back and top of an auto tag to prevent it from being bent or deformed, said bracket being provided with a longitudinal slot in its leg whereby said bracket is attached to said first mentioned member and whereby it may be adjusted to accommodate different width tags, and the hooked top of said inverted J-shaped bracket adapted to engage the top of said auto tag.

References Cited in the file of this patent

UNITED STATES PATENTS

| Number | Name | Date |
|---|---|---|
| 972,312 | Woodruff | Oct. 11, 1910 |
| 1,463,358 | Cordes | July 31, 1923 |
| 1,590,562 | Blonigen | June 29, 1926 |
| 2,082,732 | Campbell | June 1, 1937 |
| 2,254,790 | Benton | Sept. 2, 1941 |